(12) United States Patent
Clayton et al.

(10) Patent No.: US 6,583,994 B2
(45) Date of Patent: Jun. 24, 2003

(54) METHOD AND APPARATUS FOR SOFT SWITCHED AC POWER DISTRIBUTION

(75) Inventors: Paul S. Clayton, Santa Clara, CA (US); Aaron J. Mendelsohn, Campbell, CA (US)

(73) Assignee: Space Systems/Loral, Palo Alto, CA (US)

(*) Notice: Subject to any disclaimer, the term of this patent is extended or adjusted under 35 U.S.C. 154(b) by 0 days.

(21) Appl. No.: 09/884,734

(22) Filed: Jun. 19, 2001

(65) Prior Publication Data

US 2002/0191418 A1 Dec. 19, 2002

(51) Int. Cl.[7] .......................................... H02M 3/335
(52) U.S. Cl. ................................. 363/21.18; 363/131
(58) Field of Search .............................. 363/16, 17, 20, 363/21.12, 21.18, 21.17, 70, 97, 131

(56) References Cited

U.S. PATENT DOCUMENTS

| | | | |
|---|---|---|---|
| 4,063,307 A | 12/1977 | Stephens | 363/21 |
| 4,323,961 A | 4/1982 | Josephson | 363/56 |
| 5,500,791 A | 3/1996 | Kheraluwala et al. | 363/17 |
| 5,568,368 A | 10/1996 | Steigerwald et al. | 363/17 |
| 5,594,629 A | 1/1997 | Steigerwald | 363/21 |
| 5,933,049 A | 8/1999 | Melse | 327/538 |
| 6,061,257 A | 5/2000 | Spampinato et al. | 363/56 |
| 6,069,803 A * | 5/2000 | Cross | 363/21.14 |
| 6,275,396 B1 * | 8/2001 | Farrar | 363/65 |

* cited by examiner

Primary Examiner—Michael Sherry
Assistant Examiner—Gary L. Laxton
(74) Attorney, Agent, or Firm—Perman & Green, LLP

(57) ABSTRACT

An improved soft switched AC power distribution system for minimizing electromagnetic interference and AC losses in an AC power distribution system. The improved AC power distribution system comprises a flyback transformer comprising a primary winding and at least one intermediate secondary winding. A synchronization control circuit is connectable to the primary winding while at least one load transformer is connectable to the at least one intermediate secondary winding. The at least one load transformer connectable to the at least one intermediate secondary winding is connectable via an EMI shielded connection with controllable voltage and current rise times.

25 Claims, 13 Drawing Sheets

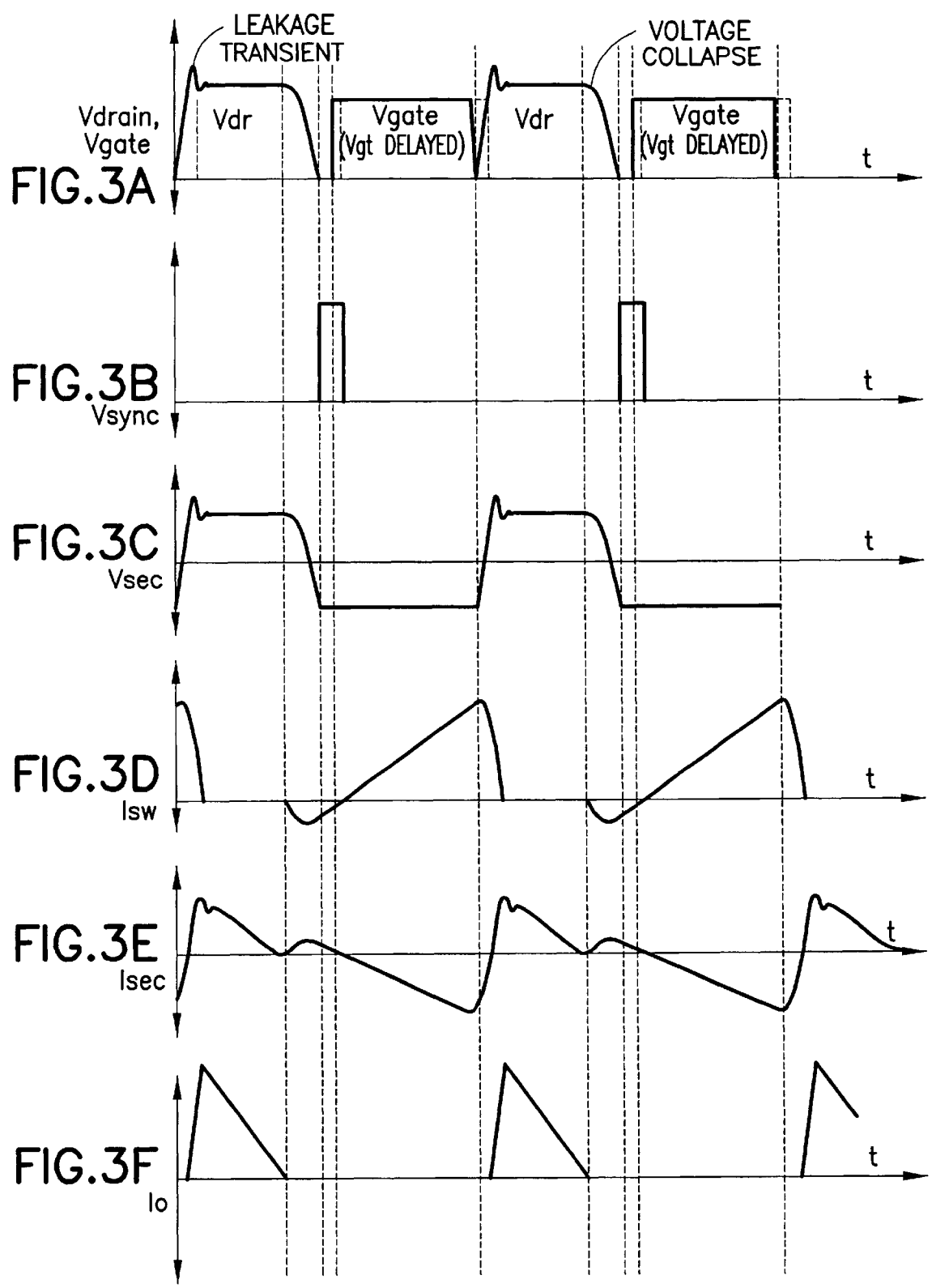

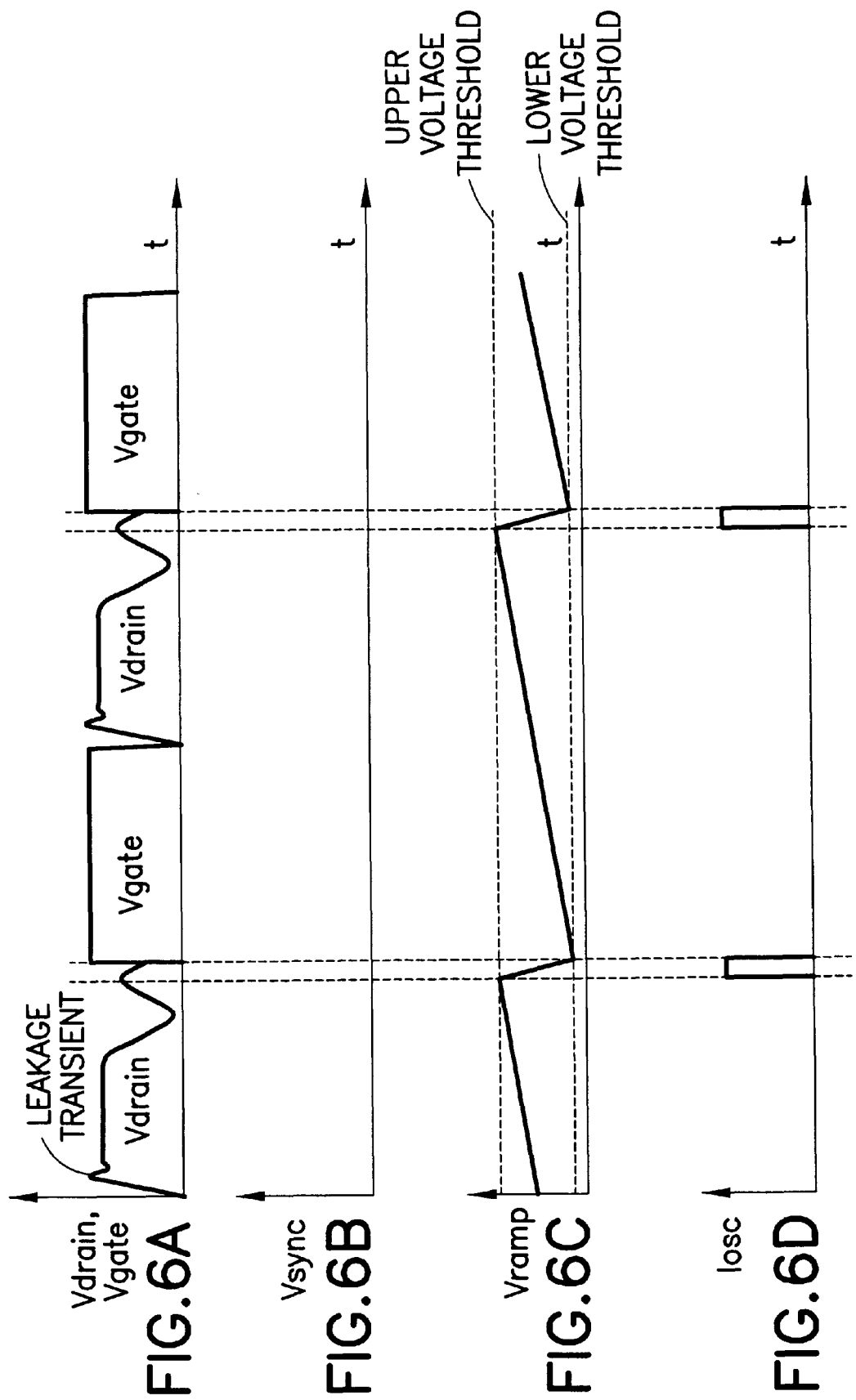

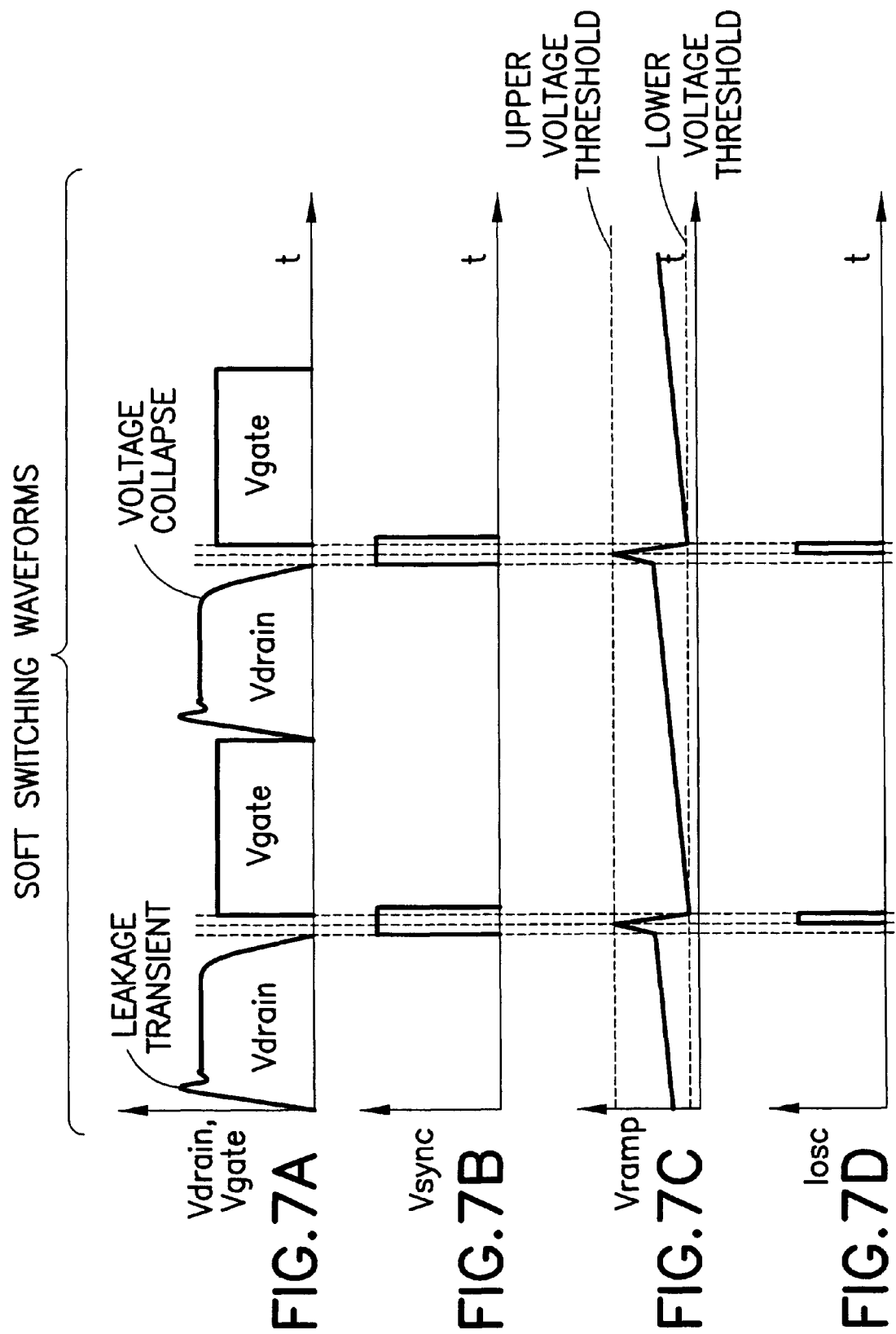

METHOD AND APPARATUS FOR SOFT SWITCHED AC POWER DISTRIBUTION

BACKGROUND OF THE INVENTION

1. Field of the Invention

The present invention relates to AC power distribution systems and, more particularly, to soft switched AC power distribution systems.

2. Prior Art

AC distribution systems based on other conventional and soft switched topologies using flyback converters are currently in use. The purpose of such systems is to convert power from a DC source to AC, and distribute that power to one or more loads. In most applications, the power will be converted back to DC at the point of load. AC power distribution allows many different DC power outputs, referenced to many different circuit commons, to be created with a minimum number of circuit components. The AC link will radiate and couple electromagnetic interference (EMI) into other nearby equipment, which may degrade the performance of that equipment. The potential for EMI problems is exacerbated if the AC power waveforms contain high frequency harmonics. For this reason, it is advantageous to limit the risetimes of the voltage and current waveforms of the AC power. One method of limiting the risetimes without introducing additional loss is the use of a resonant circuit. This is commonly known as "soft switching". Several methods for accomplishing this have been successfully implemented, including one that uses a push-pull topology. The push-pull topology, and other bilateral circuits, requires less filtering at the input and outputs than a flyback, but requires more parts per DC output than a flyback, or other unipolar converter topology. In addition, flyback converters in several forms are in common use for DC to DC power conversions.

In general, flyback converters may be classified as:

a) SOPS (Self Oscillating Power Supply) converters in which the demagnetization of the transformer on an auxiliary winding is detected (verification of a complete transfer to the secondary circuit of the energy accumulated while driving the switch connected to the primary winding, during a subsequent off phase of the switch evidenced by the current through the secondary winding becoming null so that the successive turning on of the power switch takes place with a null current in the primary winding), to control the turning on of the power transistor. As an alternative, a null voltage across the switch may be detected before restoring current in the switch and primary winding, which provides "soft" turn-on of the switch. In this way, a "discontinuous" functioning mode is realized which is different from a continuous functioning mode in which the power switch is turned on with current still flowing in the secondary winding. This mode of operation is a discontinuous functioning mode that results in altering the switching frequency as a function of the power absorbed by the load connected to the converter output (secondary circuit of the transformer) and also as a function of the voltage of the input power source.

b) Fixed frequency converters operating in a discontinuous mode under nominal operating conditions. However, under other conditions, such as for example, during start-up conditions and when experiencing or recovering from short circuit events, they work in a continuous manner, unless the monitoring of the demagnetization is effected, typically on an auxiliary winding, for disabling the functioning of the oscillator that establishes the fixed switching frequency.

c) Fixed frequency converters operating in a continuous mode under normal operating conditions. In this operating mode, the primary switch is turned on while current is still flowing in the secondary winding. This operating mode reduces the RMS currents in the transformer windings and filter capacitors, but generally requires a larger transformer than is needed in a discontinuous converter.

As noted above, flyback converter configurations include circuits on the secondary windings for monitoring the output voltage and providing feedback to the primary side; where the feedback signal is used to control the switching oscillations of the power transistor. In this manner the voltage induced in the secondary winding may be regulated by controlling the time that current is allowed to flow in the primary winding before the current through the primary is turned off and the magnetizing field is allowed to collapse.

In addition, typical switching converters may also be characterized by the generation of undesirable electromagnetic interference (EMI). EMI may result from the high frequency and rapid rise-time of the induced current in the secondary winding and other voltage and current signals; where the rapid rise time is a result of the power transistor switching at an oscillation frequency of generally 20 Khz or greater.

A conventional solution for controlling EMI includes line filters in the power supply circuitry for rejecting the coupling of high frequency EMI signals. A common form of such a filter includes series connected inductances in the power supply branches, and shunt connected capacitors disposed either between power supply lines or between a power supply line and ground. Consideration of "ground" or a "point of common reference potential" as a part of the circuit is particularly important in rejecting common mode EMI, i.e. interference that is generated by the offending circuitry with reference to ground. The shunt line filter capacitance between the power supply and ground are helpful in alleviating EMI. However, adding inductors and capacitors to reduce EMI has the associated disadvantage of increasing manufacturing complexity and cost as well as increasing the necessary space required to accommodate the extra components.

These approaches are effective in limiting EMI in the DC input and output voltages, but have little or no effect on EMI radiated or coupled from the transformer, switching devices, and associated conductors. These EMI effects are especially prevalent in a distributed AC power system, in which AC signals are conducted over relatively long distances. Controlling the rise times and fall times of the voltages and currents can greatly reduce such EMI.

SUMMARY OF THE INVENTION

In accordance with one embodiment of the invention, an improved soft switched AC power distribution system for minimizing electromagnetic interference (EMI) and power loss is provided. The improved AC power distribution system comprises a flyback transformer comprising a primary winding and an intermediate secondary winding. A synchronization control circuit including a switch connectable to the primary winding controls the current through the primary winding. At least one load transformer, having a primary winding and at least one secondary winding, is connected to the intermediate secondary winding through an EMI shielded AC conduit. At least one output circuit (AC to DC converter) comprising a secondary winding coupled to the at least one load transformer, at least one rectifier connected to the at least one winding, and at least one output capacitor connected to the at least one rectifier is provided. The synchronization control circuit initiates current flow in the primary winding when the natural resonance of the circuit causes the voltage across the primary switch to collapse to zero. A resonating capacitance connectable to the primary switch controls voltage and current risetimes and minimizes power loss.

In accordance with another embodiment, the invention includes a method for providing an improved soft switched AC power distribution system. The method includes the steps of providing a flyback transformer having a primary winding and at least one secondary intermediate winding. The method further comprises the steps of providing current flow through the primary winding to induce energy storage in the flyback transformer and sinking the current flow through the primary winding in order to collapse the flyback transformer's magnetic thereby transferring energy to the at least one secondary intermediate winding. The method further recites steps of providing a resonating capacitance connectable across the primary switch, and steps for sensing substantially null voltage across the primary switch, indicating that the switch may be turned on with minimal energy loss and EMI, and indicating substantial energy transfer to the at least one secondary winding. Upon sensing substantially null voltage across the primary switch, current flow through the primary winding is restored.

In accordance with another embodiment of the invention, a method for controlling electromagnetic interference (EMI) in a soft switched AC power distribution system is provided. The method comprises the steps of providing a flyback transformer, wherein the flyback transformer comprises a primary winding and at least one secondary intermediate secondary winding. The method further recites the steps of providing a synchronization control circuit for controlling current flow through the primary winding, and providing a resonating capacitance whose value is chosen to indirectly control voltage and current risetimes in the AC power distribution system, wherein voltage and current risetimes are associated with EMI.

BRIEF DESCRIPTION OF THE DRAWINGS

The foregoing aspects and other features of the present invention are explained in the following description, taken in connection with the accompanying drawings, wherein:

FIGS. 3A–3C are illustrations of voltage waveforms of the soft switching distributed power system shown in FIG. 2;

FIGS. 3D–3F are illustrations of current waveforms of the soft switching distributed power system shown in FIG. 2;

FIGS. 6A–6D are waveform illustrations associated with fixed frequency conditions;

FIGS. 7A–7D are waveform illustrations associated with soft switching conditions.

DETAILED DESCRIPTION OF THE PREFERRED EMBODIMENT

Figure 1A:
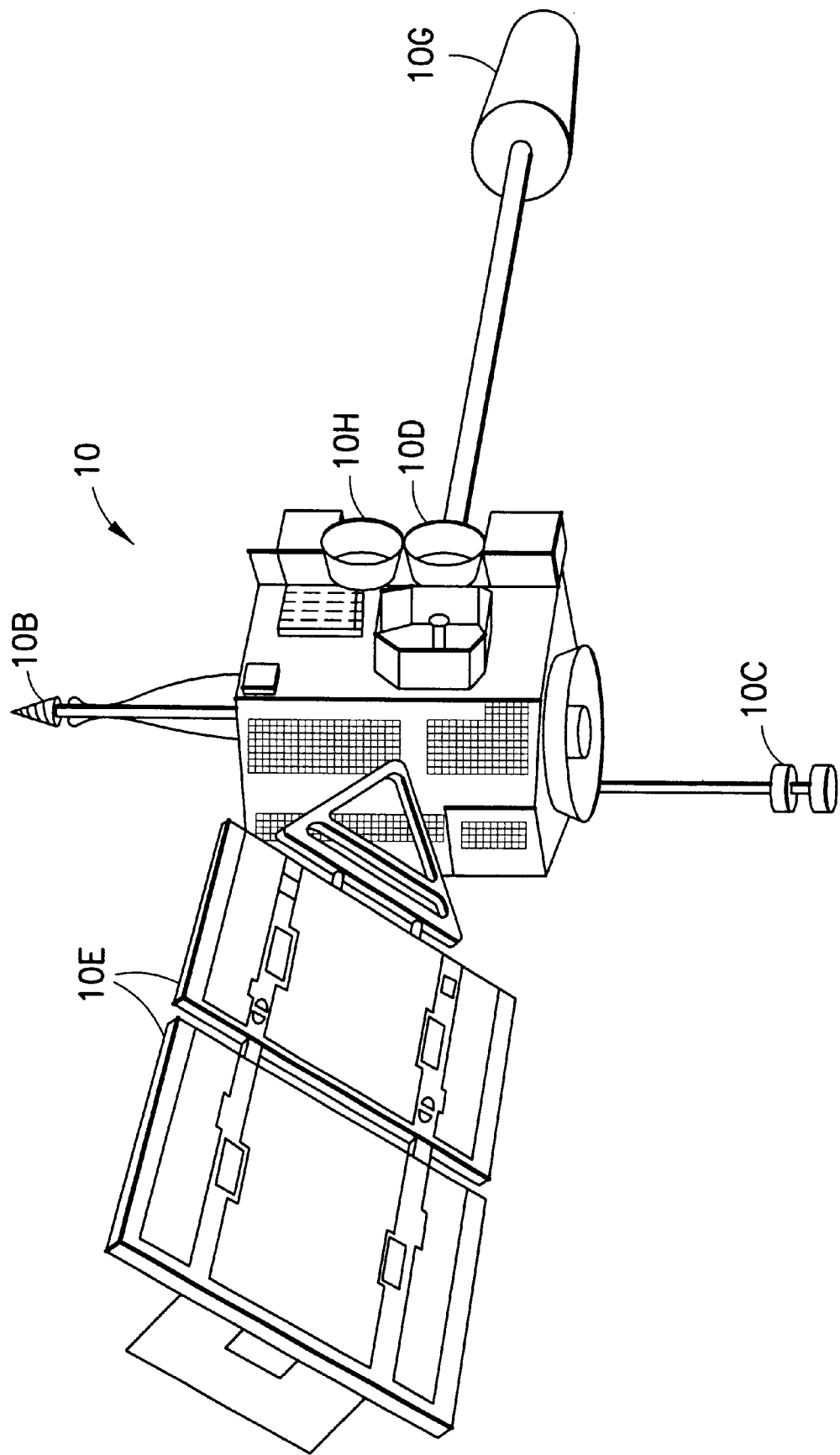
FIG. 1A is a diagrammatic illustration of a spacecraft with solar arrays and sensors.

Although the present invention will be described with reference to the embodiments shown in the drawings, it should be understood that the present invention can be embodied in many alternate forms of embodiments.

Referring to FIG. 1A, there is shown a perspective view of a spacecraft 10, incorporating features of the present invention. It is readily appreciated that DC power aboard a solar powered satellite is obtained through illumination of the satellite's solar panels 10E. It is further appreciated that orientation towards a particular reference requires attitude control to maintain the solar panels 10E of the solar powered satellite 10 to continuously face the sun at an optimal angle as the satellite 10 orbits the earth. Such attitude control systems as well as other onboard systems require power at various DC voltages. In addition, each device, such as the antenna 10B, magnetometer 10H, or Earth sensor 10C may require voltages referenced to its local voltage reference, to reduce the propagation of electromagnetic interference (EMI). In addition, a satellite power system must be fault tolerant, due to the difficulty of repairing the satellite once it is in orbit.

Figure 1B:
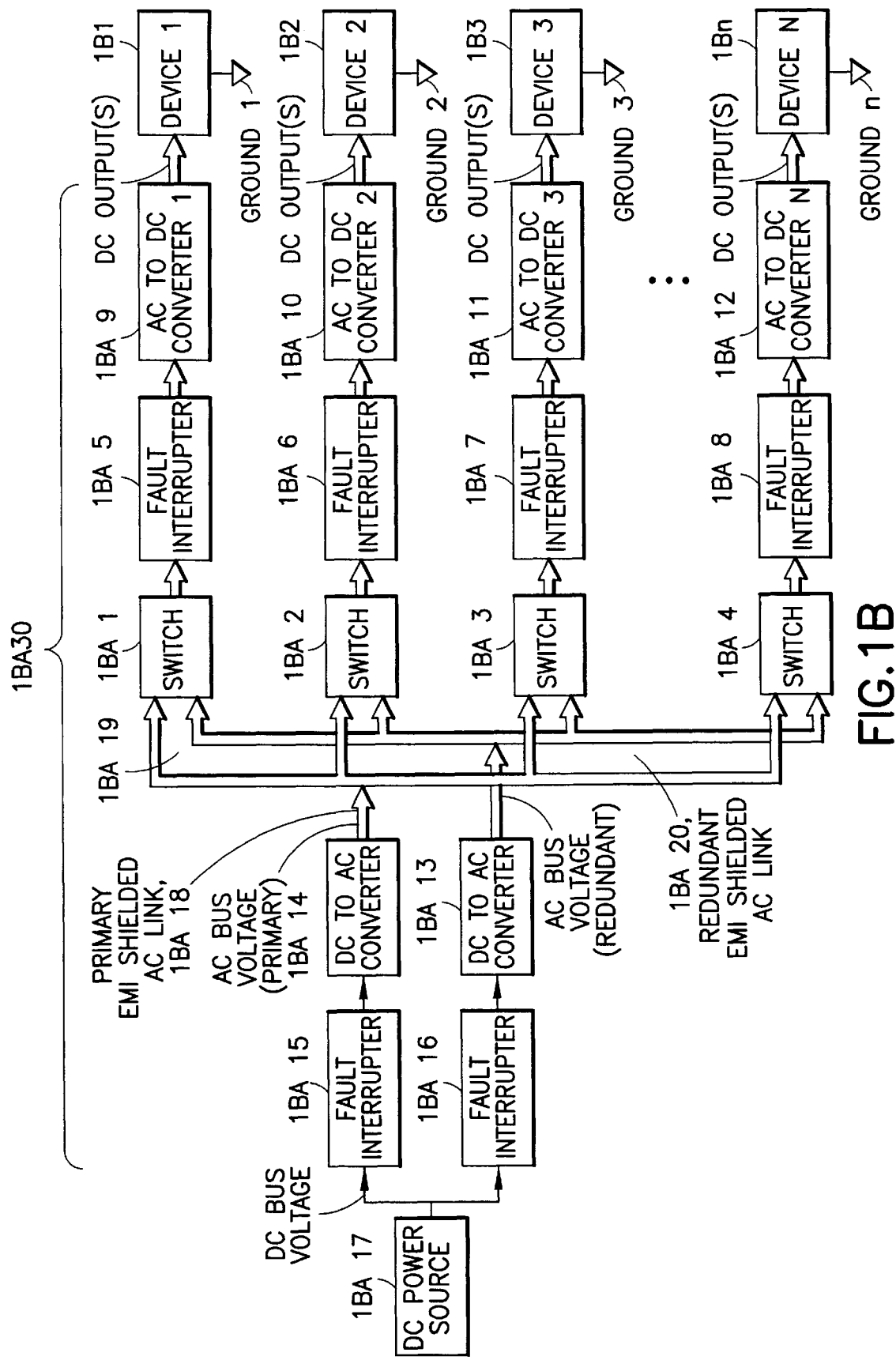
FIG. 1B is a block diagram of AC power distribution in electronic system.

Referring also to FIG. 1B, the block diagram illustrates a fault tolerant power distribution feature of the present invention, such as may be used in satellite applications. FIG. 1B illustrates several devices 1B1–1Bn on board a spacecraft or incorporated in an electronic system, powered by a fault tolerant AC power distribution system 1BA30. In FIG. 1B, DC power from source 1BA17 is converted to AC power in the DC to AC converters 1BA13–1BA14, and distributed to various devices in a satellite or other application. Because most satellite devices require DC power, AC to DC converters 1BA9–1BA12 convert the power back to DC at the point of application. In addition, FIG. 1B illustrates how such a system may be made fault tolerant. Still referring to FIG. 1B, there are shown fault interrupters 1BA15–1BA16 at the inputs of two DC to AC converters 1BA13–1BA14. These prevent either DC to AC converter 1BA13–1BA14 from disabling the DC power source 1BA17. There are also shown two AC links 1BA18, 1BA20, which distribute power through switches 1BA1–1BA4, through fault interrupters 1BA5–1BA8, through AC-DC converters 1BA9–1BA12, to the various load devices 1B1–1Bn. Each AC to DC converter 1BA9–1BA12 is fed by a switch 1BA1–1BA4, respectively, which allows either DC to AC converter 1BA13–1BA14 to be connected to the AC to DC converter associated with that device. The fault interrupters 1BA5–1BA8 prevent each individual load 1B1–1Bn from disabling either DC to AC converter. The use of AC distribution allows one fault interrupter 1BA5–1BA8 to be used for each device 1B1–1Bn, regardless of the number of DC outputs required by the devices. A system so configured prevents the failure of one device from disabling other devices in the satellite. In addition, the use of a transformer in each AC to DC converter allows each device to reference its circuitry to a local voltage reference, which helps prevent EMI propagation.

Figure 2:
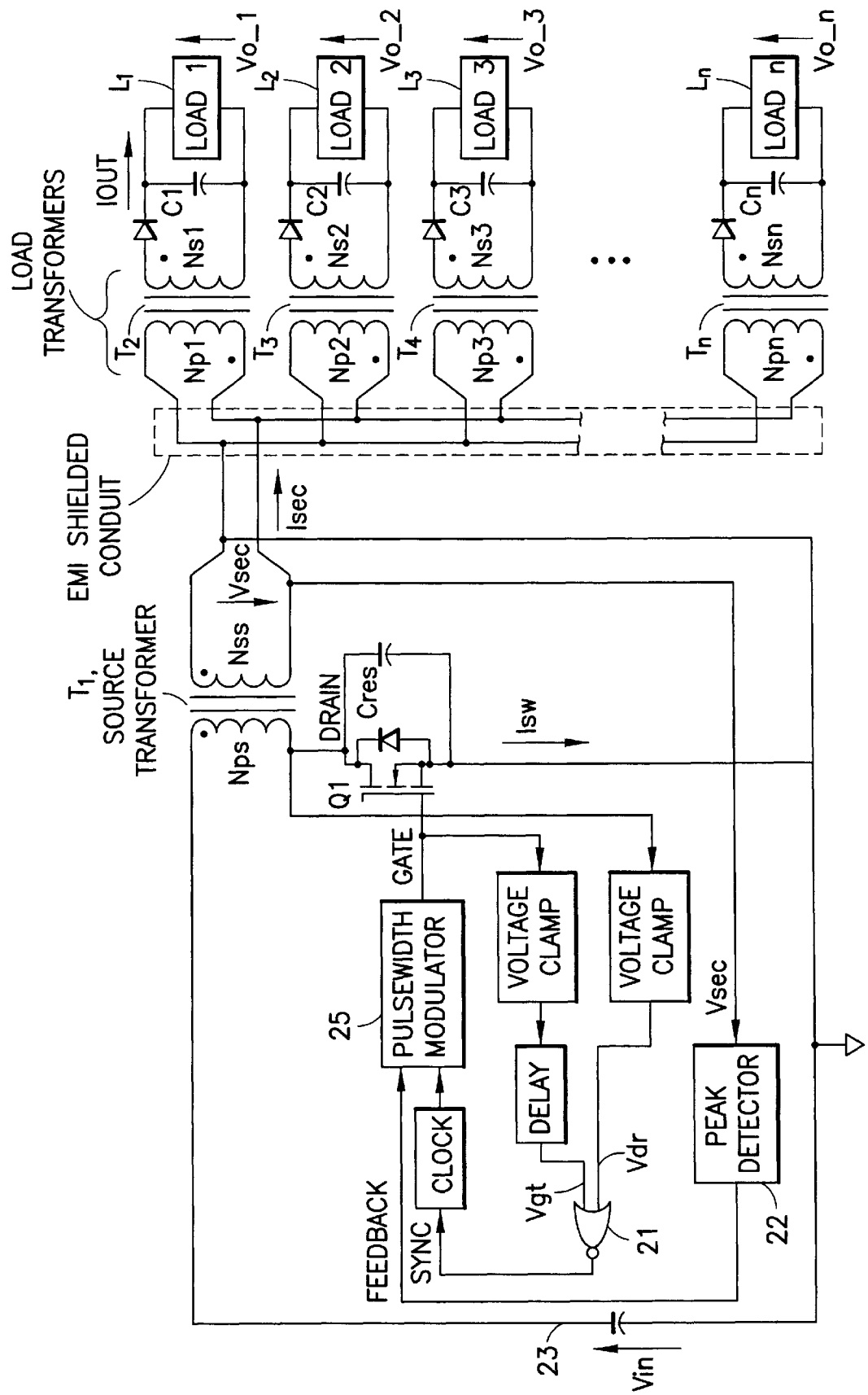
FIG. 2 is a simplified schematic of a soft switching distributed AC power system incorporating features of the present invention.
Figure 4A:
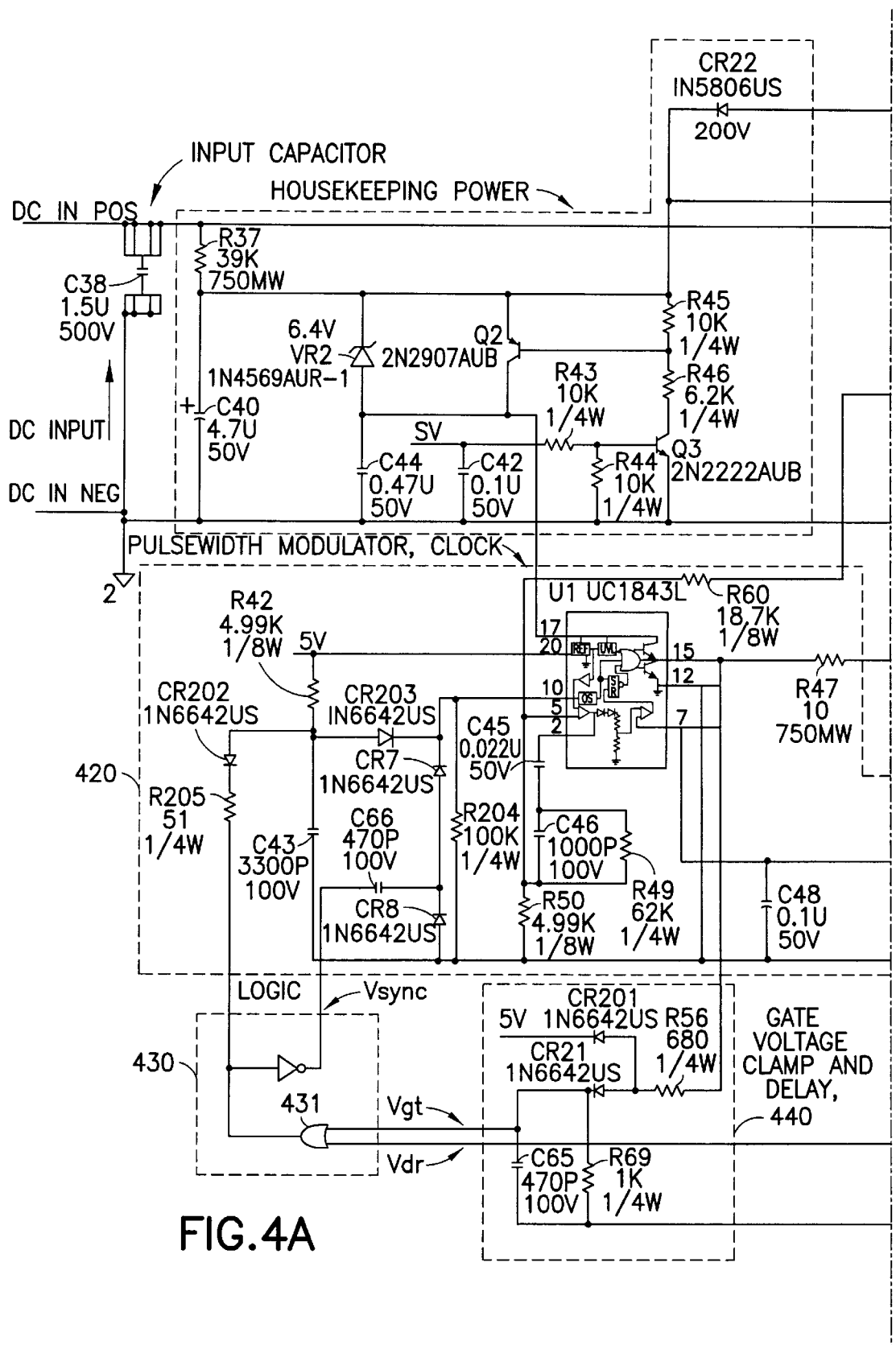
FIG. 4 is a detailed schematic of one implementation of the invention.
Figure 4B:
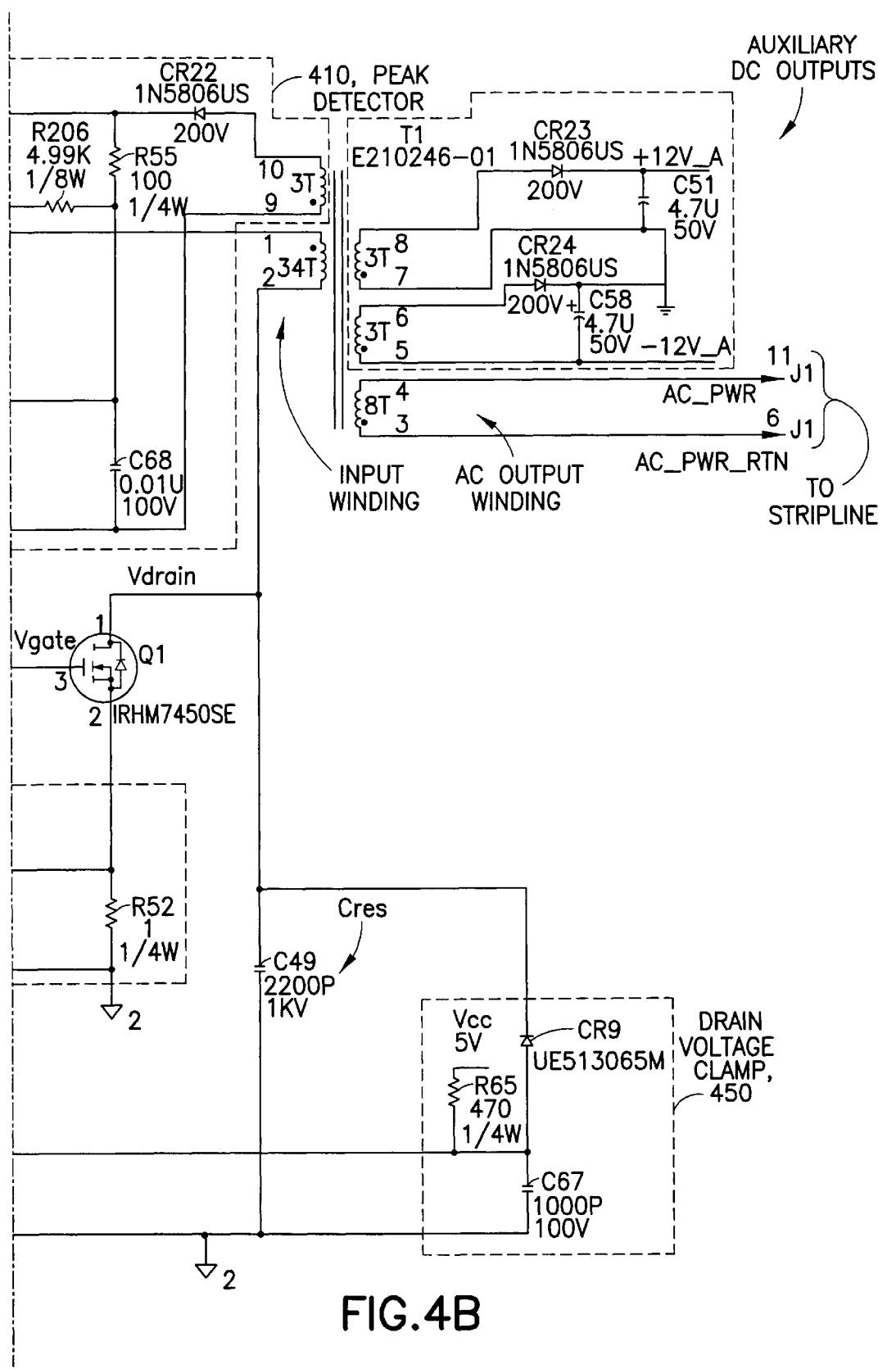
Figure 4C:
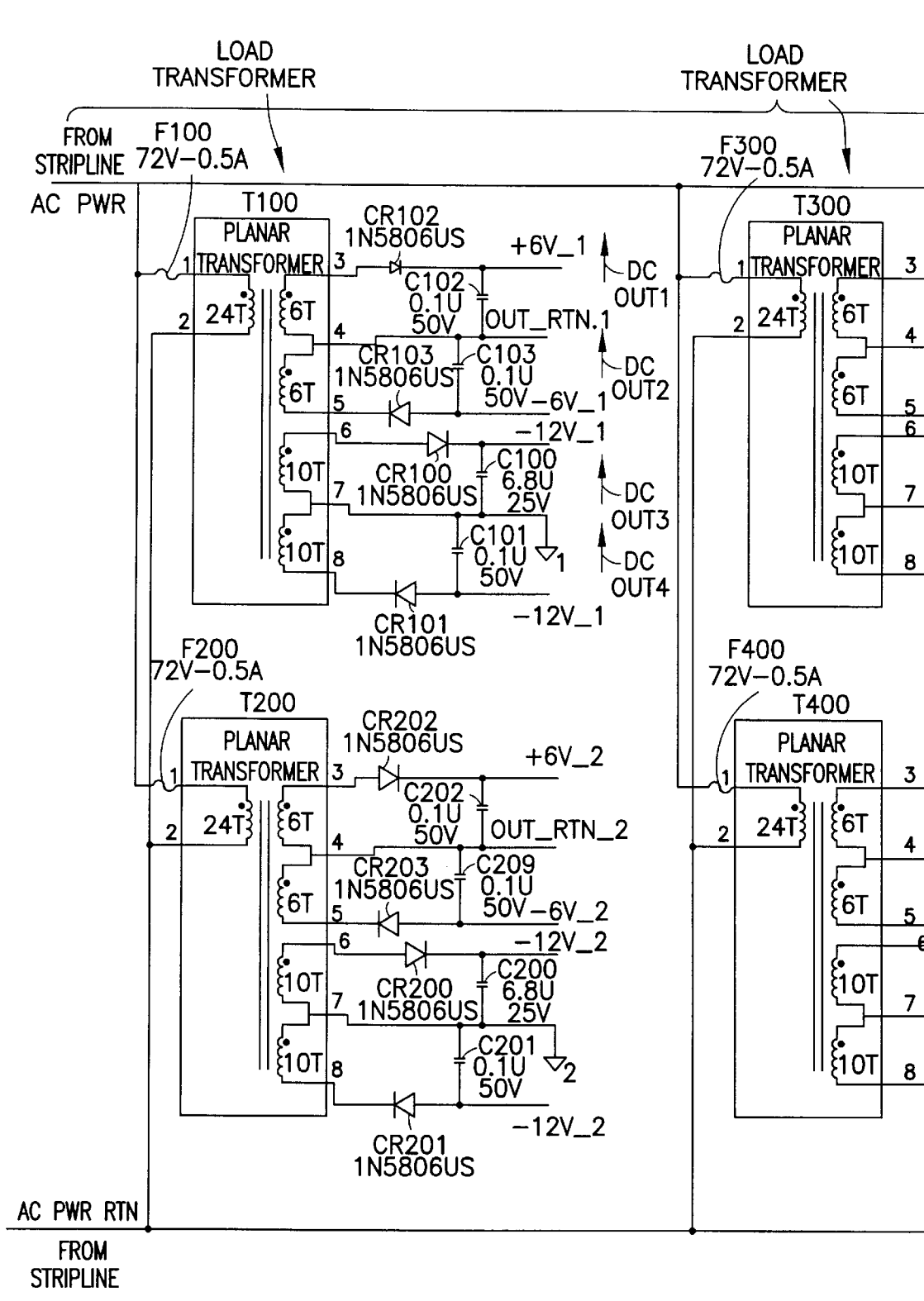
Figure 4D:
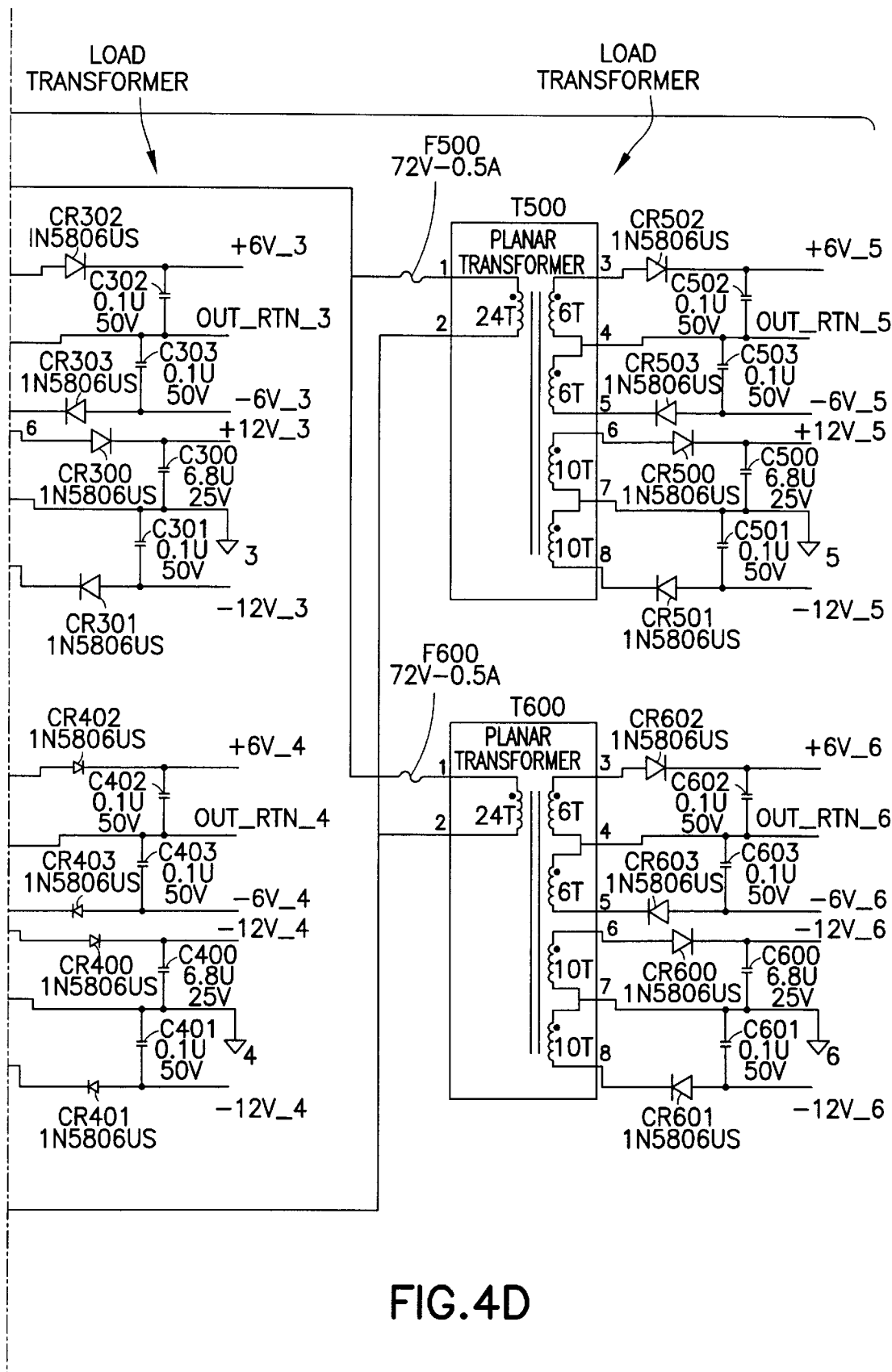

Referring also to FIG. 2 there is shown a simplified circuit schematic of a DC—DC distributed power system incorporating features of the present invention shown in FIG. 1. The circuit incorporates a flyback converter in which a flyback transformer is split into a source transformer T1 having a primary winding and an intermediate secondary winding coupled through an EMI shielded conduit to an arbitrary number of load transformers T2–Tn.

Figure 5:
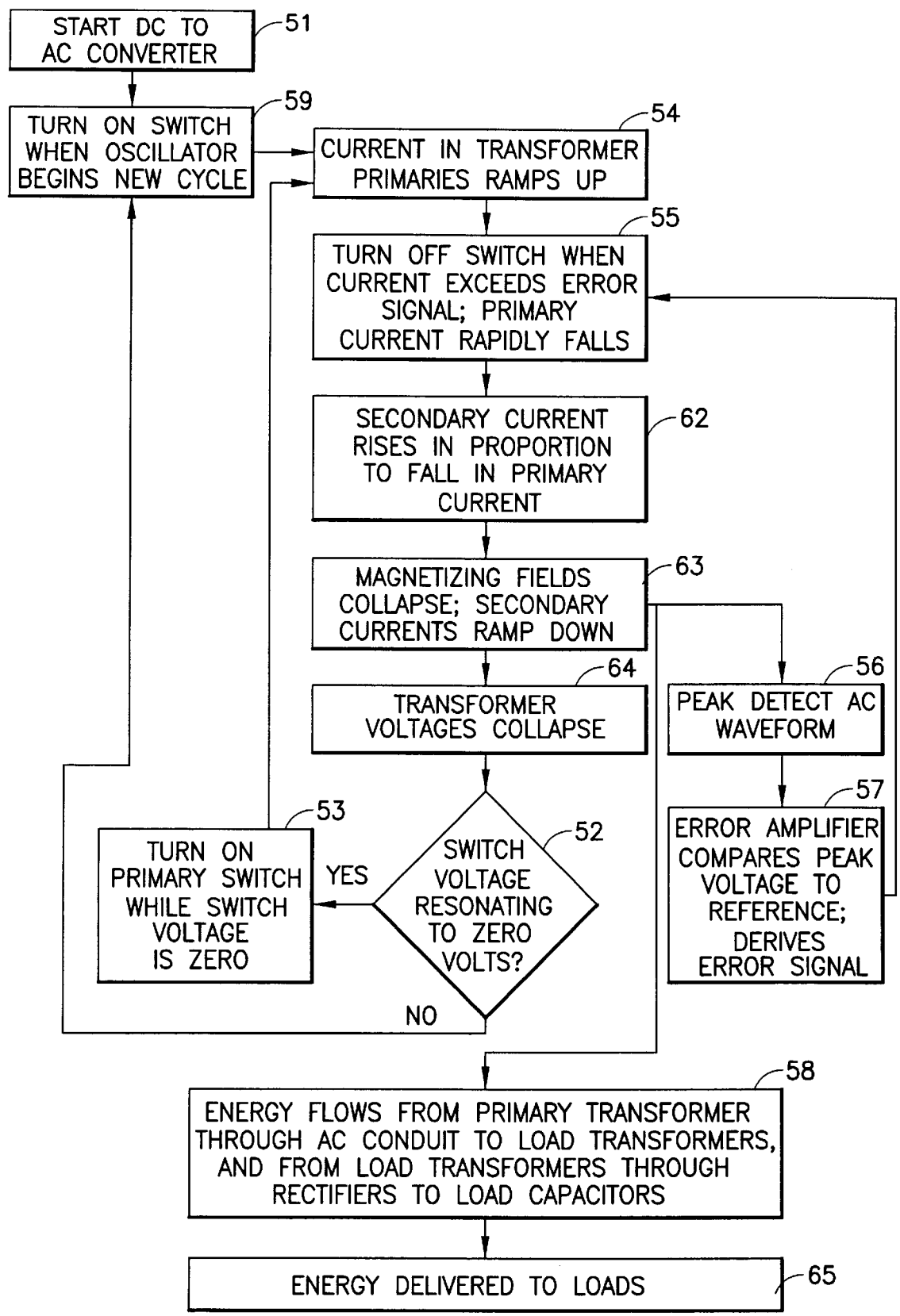
FIG. 5 is a method flow chart describing the operation of the invention shown in FIG. 2.

Referring still to FIG. 2 and now FIG. 5, the converter is started 51 and energy is stored in the magnetizing inductance of the primary winding Nps of the source transformer T1, and the magnetizing inductances of the primary windings Np1–Npn of the load transformers T2–Tn when the power transistor switch, Q1, is on. During this period, the current through Q1 (Isw in FIG. 3D) and the primary winding Nps rises according to a predetermined rate for a duration roughly equal to the time width of the voltage pulse applied to the power transistor gate. The current rise rate is set 54 by the primary inductance of transformer T1–Tn and the input voltage (FIG. 3D, ISW). Q1 is turned off on the failing edge of the voltage pulse (Vgt in FIG. 3A) resulting in rapidly falling current 55 through the primary winding Nps. The rate at which the primary current falls and voltage across Q1 rises, is limited by the parasitic capacitances present, and the value of $C_{res}$. Through transformer action energy is transferred from the collapsing magnetic field to produce voltage Vsec (Vsec in FIG. 3C) on the intermediate secondary winding Nss. Vsec is coupled 58 to at least one load transformer T2–Tn primary winding Np1–Npn via an EMI shielded conduit and again through transformer action to the load transformer T2–Tn secondary windings Ns1–Nsn where the voltage is rectified and stored in the load capacitors (see Iout, FIG. 3F). The energy storage, during the time Q1 is on, is divided between the source transformer T1 core and the load transformer T2–Tn cores. When Q1 is off, the energy stored in the load transformers T2–Tn is transferred to the load capacitors C1–Cn. At the same time the energy stored in the source transformer T1 is transferred through the EMI shielded conduit and load transformers T2–Tn to the load capacitors C1–Cn. Referring to FIG. 3E, the energy transfer can be seen by observing the Isec waveform. When Q1 is off, Isec ramps down from a positive value, indicating that the energy is flowing from the source transformer T1 through the load transformers T2–Tn to the loads L1–Ln. Isec crosses zero roughly when the drain voltage Vdr (see Vdr FIG. 3A) reaches zero. While the drain voltage is at zero volts (Q1 is on during most of this period), Isec ramps to a negative value, indicating that energy is being stored in the load transformers T2–Tn as well as the source transformer T1. The Isec waveform shown in FIG. 3E corresponds to a situation in which the energy stored in the source transformer T1 and all of the load transformers T2–Tn combined is roughly equal. The RMS value of Isec is minimized for a given power and Vsec value(see Vsec FIG. 3C) if the energy storage is divided in this way. The division of energy storage between the source transformer T1 core and the load transformer T2–Tn cores can be controlled by setting the magnetizing inductances of the transformers to appropriate values.

Soft (zero voltage) switching is achieved by allowing the natural resonance of the source transformer T1, the load transformers T2–Tn, capacitor $C_{res}$, and distributed circuit capacitances to resonate the voltage Vdr (see Vdr FIG. 3A) across Q1 to zero before it turns on. The voltage Vdr resonates to zero, once the current delivered to the load capacitors (Io) ramps to zero, provided the following inequality is satisfied:

$$Vo\_x > Vin*(Nsl*Nss)/(Npl*Nps), \quad 1 < x < n \quad \text{(equation 1)}$$

where the variables are as shown in FIG. 2. Vo_1 through Vo_n are the voltages at the n outputs shown in FIG. 2, which are approximately the same. For given input and output voltages, appropriate turns ratios may be chosen such that the inequality shown in equation 1 is satisfied. Once the voltage Vdr across Q1 has resonated to zero, a logic circuit 21 detects 52 the event and triggers the pulse width modulator 25 to begin the next switching cycle by applying 53 a voltage pulse to Q1 gate. Alternatively, if the event is not detected 52 the switch Q1 is turned on 59 at a predetermined interval. The output of the logic circuit 21 (see Vsync in FIG. 3B) is high when both the delayed Q1 gate voltage (see Vgt in FIG. 3A) and the Q1 drain voltage (see Vdr in FIG. 3A) are zero, which occurs only for a brief period after the Q1 drain voltage Vdr resonates to zero. The voltage Vgt pulse duration is determined by peak detecting 56 the voltage Vsec on the intermediate secondary Nss which is compared 57 with a predetermined voltage.

Output voltage regulation is achieved by peak detecting with peak detector 22 the voltage at the output of the intermediate secondary winding Nss of the flyback source transformer T1 (Vsec in FIGS. 2,3) and feeding this value to the feedback input of the pulse width modulator 25. The peak voltage at the output of the source transformer T1 (excluding the spike) is proportional to the output voltages. Alternatively, the load voltages may be sensed directly, or through another winding on T1.

The voltage and current rise-times in the intermediate secondary winding are controlled by capacitor $C_{res}$, connected across Q1, which is shown in FIG. 2. The larger $C_{res}$ is, the slower the rise-times will be, thus reducing EMI. A sufficiently large value of $C_{res}$ also eliminates the need for dissipative voltage limiting to protect Q1 from the leakage transient which occurs at turn-off (see FIG. 2). The energy stored in $C_{res}$, when the drain voltage is high, is transferred to the source transformer T1 magnetizing inductance as the voltage collapses. The energy is transferred back to $C_{res}$ when the Q1 drain voltage rises again and is not dissipated as it would be in a hard switching converter. Thus, there is no power loss incurred by slowing the voltage and current rise times by loading the circuit with $C_{res}$. In addition the load transformers T2–Tn may be connected to the intermediate secondary winding Nss with a coaxial cable or stripline (see FIG. 2) to minimize radiated EMI and AC loss. If a stripline is used, it can be embedded in a printed wiring board, or a flex cable. In an alternate embodiment a twisted wire connection may be suitable.

The switching control circuitry initiates current flow in the primary winding when the natural resonance of the transformer magnetizing inductances and the parasitic capacitances of the switches, transformers, and AC link causes the voltage across the switch to collapse to zero. This minimizes EMI due to the relatively slow fall time of voltage across the switch, and throughout the circuit. It also minimizes power loss, because the energy stored in the parasitic capacitances of the circuit is stored in the transformer magnetizing inductances, rather than being dissipated, as it would be if the switch begins to conduct with a large voltage across it. In an alternate embodiment the flyback transformer may comprise a saturable core that is capable of reducing variation in operating frequency with changes in load current, again minimizing EMI.

In addition, the connection of the capacitor $C_{res}$ across the switch minimizes EMI and power loss associated with the initiation and interruption of current flow in the primary winding, and elsewhere in the system. The value of the capacitor can be set at the time of manufacture, to obtain the lowest loss and EMI. In an alternate embodiment any suitable type of capacitor could be provided. For example, $C_{res}$ can be a fixed capacitance selected at the time of manufacture or $C_{res}$ could be a variable capacitance capable of being adjusted over the life time of the circuit to compensate for component value decay.

FIG. 2 shows only one output winding on each of the load transformers T2–Tn, however it will be appreciated that several outputs may be provided if needed. These outputs have voltages related to the intermediate secondary winding voltage Vsec of the flyback transformer by the turns ratios of the load transformers T2–Tn. It will be further appreciated that voltage regulation is advantageously accomplished by the feedback voltage Vsec from the intermediate secondary winding Nss of the source transformer T1. In this manner electrical isolation between the primary side Nsp of the source transformer T1 and the load devices L1–Ln is maintained. If isolated feedback directly from loads L1–Ln is desired, an isolated feedback circuit must be used.

Referring now to FIG. 4 there is shown a detailed schematic of one implementation of the invention. The peak detector 410 senses the positive amplitude of the AC output voltage. In this embodiment the circuit peak detects the voltage across a winding coupled to the AC output winding. In another embodiment the peak detector may be connected directly to the AC output winding (see FIG. 8). The peak detector shown contains a low pass filter R55, c68 preventing the circuit from detecting the peak of the leakage spike (see FIG. 3, Vsec). The circuit is designed to detect the flat, positive portion of the waveform Vsec, providing the most accurate estimate of the DC output voltages produced at the load transformers T100–T600.

The pulse width modulator 420 is shown in current control mode and uses a standard control integrated circuit (IC) UC 1843L U1. The circuit can operate at either a fixed frequency, or the clock can be synchronized to an externally generated signal (Vsync in FIG. 3B). During startup or other conditions when the output voltages of the AC power system are significantly below their regulated values the pulse width modulator will operate in the fixed frequency mode. When the output voltages (FIG. 2: Vo1–Von) are below their regulated levels, the voltage on the drain of switching transistor Q1 (also see FIG. 2 Q1) voltage (FIG. 3A: Vdrain) does not resonate to zero (FIG. 6, Vdrain) and no synchronization signal is generated. In this mode, the switching transistor Q1 is turned on and off at a fixed frequency. The waveforms associated with the fixed frequency condition are shown in FIGS. 6A–6D. The timing waveform Vramp FIG. 6C in the fixed frequency mode rises exponentially as C43 is charged through R42. When Vramp reaches an upper threshold voltage predetermined by U1, U1 begins to sink oscillator current Iosc shown in FIG. 6D through U1 pin 10, thus discharging C43. When C43 reaches the lower threshold voltage, U1 stops sinking current and drives the GATE signal from U1 pin 15 to a high state which turns the switching transistor Q1 on. The operating frequency in the fixed frequency mode is set by the values of R42 and C43. The values of R42 and C43 must be selected such that the fixed frequency is below the lowest operating frequency expected in the soft switching mode. This will prevent the soft switched ac power distribution from operating in the fixed frequency mode when the soft switching mode is possible.

Referring also to FIGS. 7A–7D, when the output voltages are at or near their regulated values, the circuit allows the Q1 drain voltage to resonate to zero before turning on switching transistor Q1 (FIG. 7A). In this mode Q1 will turn on and off at a variable frequency rate, the frequency determined by the DC input voltage and output power. The circuit detects the resonant fall of the switching transistor Q1 drain voltage Vdr by applying logic signals representing the voltage state of switching transistor Q1 gate Vgt and drain Vdr to logic circuit 430. Vgt and Vdr are in a logic low state if the sensed voltages are at or near 0 (zero) volts. When the sensed voltages are approximately 5 (five) or higher volts the signals are in a logic high state. The voltage clamp circuits 440,450 condition the switching transistor Q1 gate and drain voltages to produce the Vgt and Vdr voltages, respectively. The switching transistor Q1 drain voltage is blocked by CR9 if it is above 5 volts. In this state, the Vdr voltage signal is pulled up to 5 volts by Vcc through R65. When the switching transistor Q1 drain voltage is near ground, due to a resonant voltage collapse, or because Q1 is conducting, CR9 becomes forward biased and allows the Vdr signal to fall to approximately 0 volts. The voltage across the switching transistor Q1 can only fall to about −0.7 volts due to the parasitic diode in the switching transistor. At the minimum value of the drain voltage, the Vdr voltage signal is approximately 0 volts. The switching transistor Q1 gate signal is divided by resistors R56 and R69, and clamped to a maximum value of approximately 5 volts by diodes CR21 and CR 201. Capacitor C65 provides a time delay before the voltage signal Vgt is logically combined with the Vdr voltage signal. An logic OR gate 431 processes the Vdr and Vgt voltage signals. The output of the OR gate 431 is inverted to form the Vsync voltage signal. The time delay in the falling edge of the gate sense signal prevents a Vsync pulse from occurring immediately after Vgate is driven low. When the Vsync voltage signal transitions to the high state, Vramp FIG. 7C is quickly forced up through diode CR7 and capacitor C66. When Vramp reaches the upper threshold as shown in FIG. 7C, pin 10 of U1 begins to sink current Iosc as shown in FIG. 7D, discharging capacitor C66. When capacitor C66 is discharged such that Vramp reaches the lower threshold, the current into pin 10 of U1 ceases, and the gate voltage Vgt is driven high, turning on switching transistor Q1. While the Vsync signal is high capacitor C43 is discharged through diode CR202 and resistor R205. This prevents the fixed frequency oscillator from operating if Vsync pulses are present. Thus, the AC power system will operate in the soft switched variable frequency mode whenever the output voltages are near their regulated values. When the Vsync signal returns to the low state, capacitor C66 is discharged through diode CR8.

The turn-off time of switching transistor Q1 is determined by comparing the switching transistor Q1 current Isw (See FIG. 2) to a control signal at IC U1 pin 2. IC U1 pin 2 is the output of a differential amplifier within IC U1. The U1 amplifier compares the voltage sense signal Vsense to a U1 internally generated reference voltage. The voltage sense signal Vsense is divided by resistors R60 and R50. The values of resistors R60 and R50 are selected to regulate the voltage output to a desired level. Capacitors C45, C46, and resistor R49 form a feedback network for the U1 differential amplifier. When the switching transistor Q1 is turned on, the current in Q1 (Isw in FIG. 2) ramps upward. The current is converted to a voltage waveform by resistor R52. Capacitor C48 filters spurious high frequency components of the current sense waveform U1 pin 7. When the current sense waveform U1 pin 7 signal exceeds the control voltage U1 pin 2, switching transistor Q1 is switched off. The control IC U1 shown in FIG. 4 is a commonly used part designed for current mode pulse width modulation. This control method can be implemented with many alternate types of pulse width modulator Ics or by using discrete components. Voltage mode pulse width modulation, which compares the control signal to an internally generated ramp voltage, may also be used.

FIG. 4 also shows six load transformers T100–T600, each having four output windings with associated rectifiers and filter capacitors. However, it is readily appreciated that any number of outputs can be accommodated.

Figure 8A:
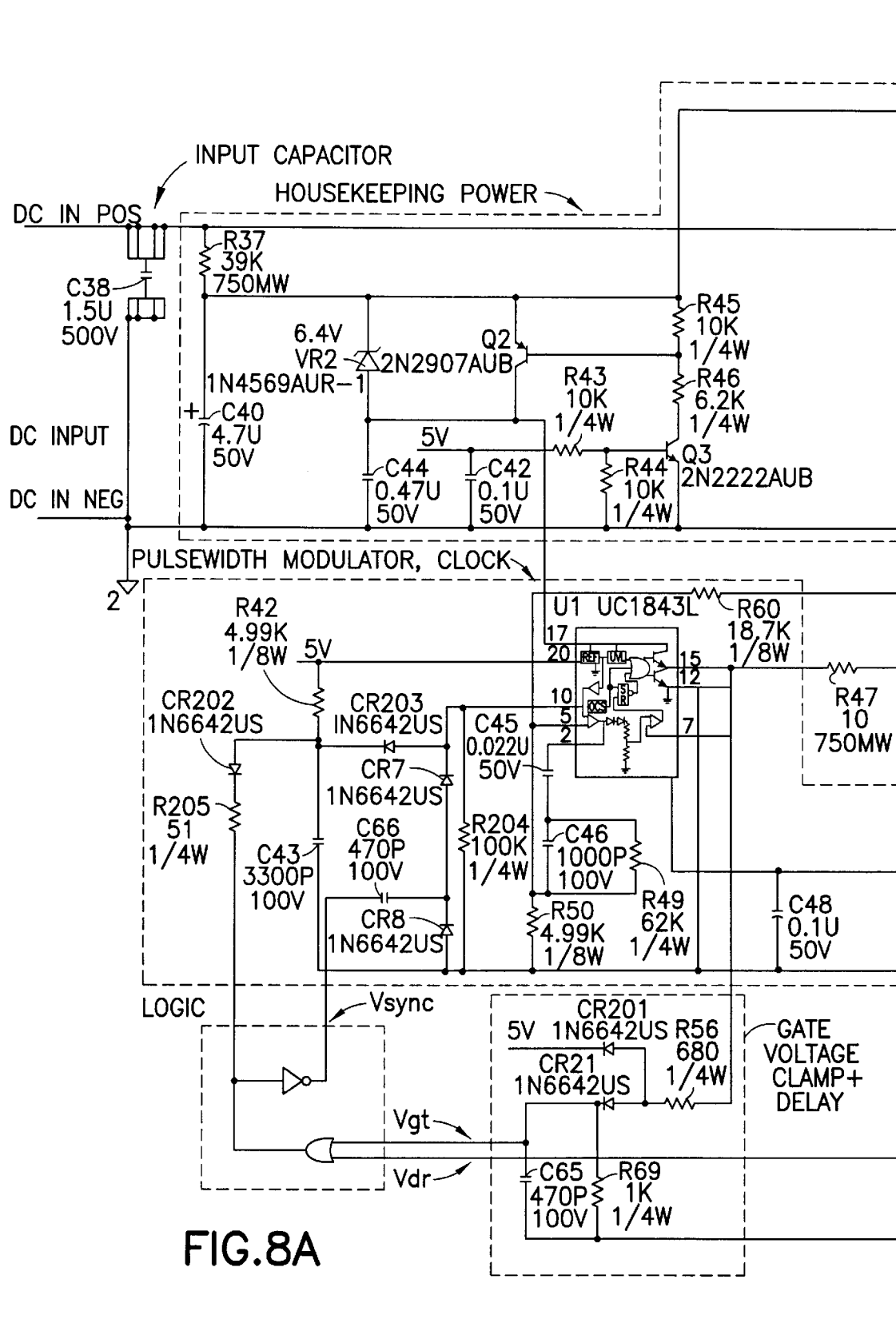
FIG. 8 is a detailed schematic diagram incorporating features of the present invention.
Figure 8B:
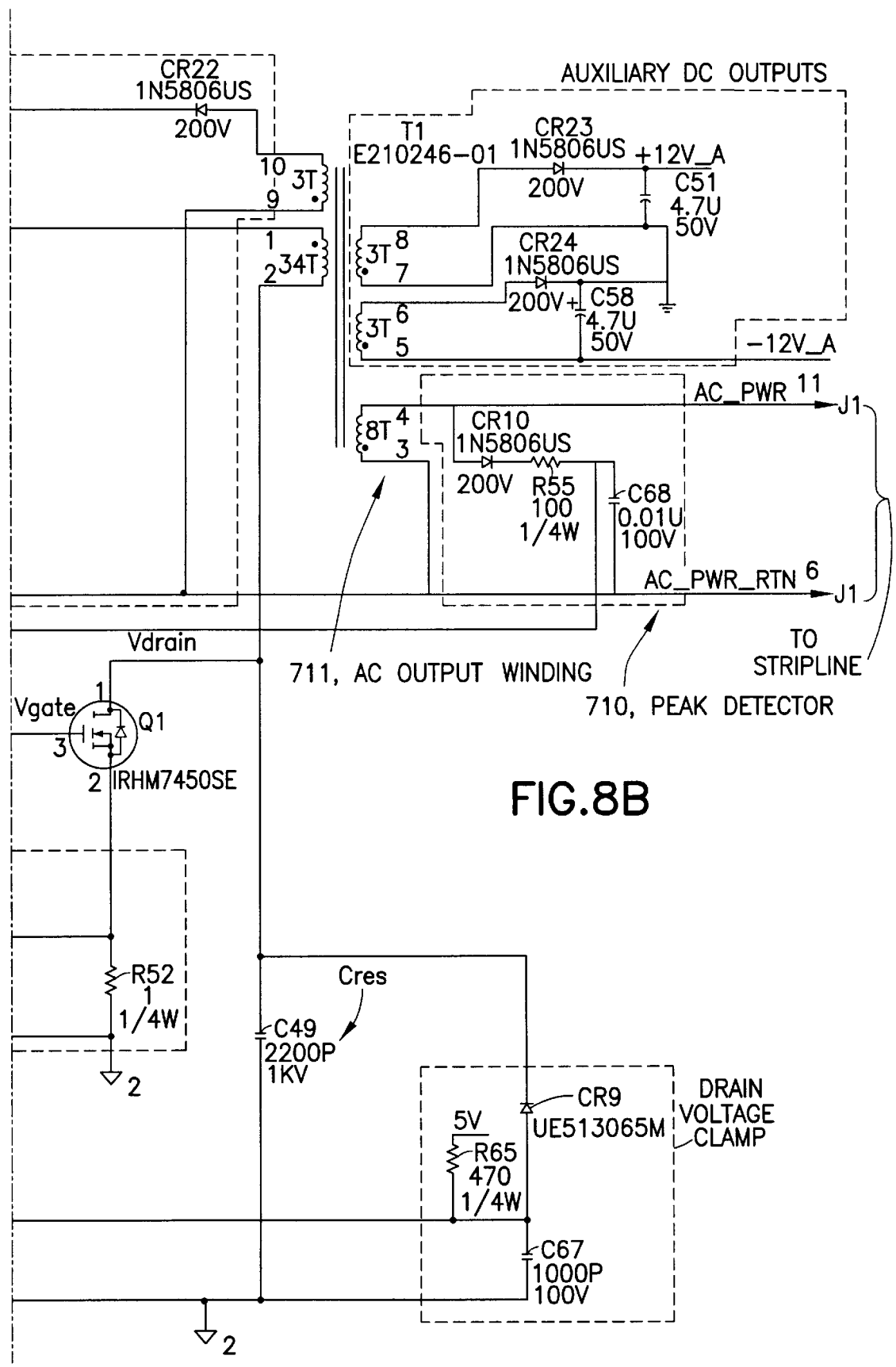

Referring now to FIG. 8 there is shown an alternate implementation of the invention. FIG. 7 is similar to FIG. 4, except that the peak detector 710 is coupled directly to the transformer T1 AC output winding 711. It can be readily appreciated that this configuration may be advantageous for applications where it is permissible to connect the AC return to the regulation circuit return.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A soft switched AC power distribution apparatus for minimizing electromagnetic interference and power loss in a power distribution system, the AC power distribution apparatus comprising:
   a source transformer capable of operating in both flyback and forward modes, the transformer comprising:
      a first primary winding;
      at least one first intermediate secondary winding;
      a first core capable of storing energy in a magnetic field;
   a synchronization control circuit connected to the first primary winding;
   at least one load transformer, capable of operating in both forward and flyback modes, connected to the at least one first intermediate secondary winding, wherein the at least one load transformer connected to the at least one first intermediate secondary winding is connectable via an EMI shielded connection, and wherein the at least one load transformer comprises:
      a second primary winding;
      at least one second secondary winding;
      a second core, which is capable of storing energy in a magnetic field;
   an AC to DC converter connected to the at least one load transformer, wherein the AC to DC converter comprises:
      at least one rectifier connected in series with the at least one second secondary winding of the at least one flyback load transformer, the rectifier being polarized such that it does not conduct when the voltage of the power source is applied to the source transformer primary winding; and
      at least one filter capacitor connected to the at least one rectifier.

2. A soft switched AC power distribution circuit as in claim 1 wherein the first primary winding, the first intermediate secondary winding, the at least once second primary winding, and the at least one second secondary winding comprise:
   a winding turns ratio, wherein the windings' turn ratio is adapted to the natural resonance of the circuit to produce a substantially null voltage across the switching device, without current being conducted in the switching device.

3. A soft switched AC power distribution apparatus as in claim 1 wherein the synchronization control circuit comprises:

a switching device for controlling current flow through the first primary winding;
a pulse width modulator for controlling the conduction period of the switching device such that at least one output voltage is held constant at a predetermined level;
a peak voltage detector coupled to the at least one second secondary winding, wherein the peak voltage detector provides a feedback signal, proportional to the at least one output voltage, for input to the pulse width modulator;
a zero voltage control circuit connected to the first primary winding and the pulse width modulator, wherein the zero voltage control circuit controls the time at which conduction is initiated in the switching device, such that conduction begins when there is a substantially null voltage across the switching device and a substantially null current in the at least one second secondary winding; and
a fixed frequency oscillator connected to the pulse width modulator, wherein the fixed frequency oscillator controls conduction in the switching device in the event that a substantially null voltage does not occur across the switching device, without the switching device being enabled within a predetermined time period.

4. A soft switched AC power distribution apparatus as in claim 3 wherein the switching device comprises:
   a transistor.

5. A soft switched AC power distribution apparatus as in claim 3 wherein the switching device comprises:
   a transistor; and
   a voltage transient suppression device connectable in parallel with the transistor.

6. A soft switched AC power distribution apparatus as in claim 5 wherein the voltage transient suppression device comprises a parallel connected capacitance.

7. A method for providing a soft switched AC power distribution circuit, the method comprising the steps of:
   providing a source transformer capable of operating in both flyback and forward modes, the transformer having:
      a first primary winding;
      at least one first secondary intermediate winding;
      and a first core capable of storing energy in a first magnetic field;
   providing at least one load transformer capable of operating in both flyback and forward modes, the at least one load transformer having:
      a second primary winding;
      at least one second secondary winding;
      a second core capable of storing energy in a second magnetic field;
   providing at least one AC to DC converter, the AC to DC converter having;
      at least one rectifier connected to the at least one second secondary winding, polarized such that the rectifier does not conduct when the voltage of the power source is applied to the source transformer primary winding; and
      at least one filter capacitor, connected to the at least one rectifier;
   connecting an EMI shielded connection between the at least one first secondary intermediate winding and the second primary winding of the at least one load transformer;
   providing a synchronization control circuit to control current through the first primary winding, the synchronization control circuit having a switching device;

controlling the time at which current conduction is initiated in the switching device;

setting a first turns ratio of the source transformer and a second turns ratio of the at least one load transformer such that the natural resonance of the soft switched AC power distribution circuit will allow the voltage across the switching device to collapse to zero without current being conducted in the switching device;

initiating a first current flow through the first primary winding to induce energy storage in the first magnetic field and the at least one second magnetic field;

interrupting the first current flow through the first primary winding in order to collapse the first and the at least one second magnetic field;

transferring energy from the collapsing first and at least one second magnetic field to the at least one AC to DC converter to at least one load, via the EMI shielded connection.

8. A method as in claim 7 wherein the step of providing a synchronization control circuit further comprises the steps of:

detecting a peak voltage of at least one voltage output from the at least one first secondary intermediate winding;

comparing the detected peak voltage to a predetermined reference voltage;

generating a feedback signal based upon the comparison of the detected peak voltage output to the predetermined reference voltage; and using the feedback signal as input to a pulse width modulator to control the duration of current flow in the first primary winding, such that the detected peak voltage is maintained at a desired level.

9. A method as in claim 8 wherein the step of providing a synchronization control circuit further comprises the steps of:

determining when a substantially null voltage event across the switching device occurs;

determining when current conduction in the switching device has not been enabled for a pre-determined period of time;

generating a synchronization signal when the null voltage event occurs and the switching device is not enabled;

applying the synchronization signal to a synchronization input of the pulse width modulator, causing it to enable the switching device.

10. A method as in claim 9 wherein the step of providing a synchronization control circuit further comprises the step of:

providing a capacitance connected in parallel to the switching device, the capacitance adapted to minimize EMI and power loss in the soft switched AC power distribution circuit, and minimize voltage stress on the switching device.

11. A method as in claim 7 wherein the step of initiating a first current flow through the first primary winding further comprises the steps of:

initiating current flow in the switching device in the event that a substantially null voltage has not appeared across the switching device within a predetermined interval.

12. A method for controlling electromagnetic interference (EMI) in a soft switched AC power distribution system, the method comprising the steps of:

providing a source transformer capable of operating in both flyback and forward modes, wherein the transformer comprises:

a first primary winding;
at least one first secondary intermediate winding; and
a first core capable of storing energy in a magnetic field;

providing at least one load transformer capable of operating in both flyback and forward modes, the load transformer comprising;

a second primary winding;
at least one second secondary winding;
a second core capable of storing energy in a second magnetic field;

providing at least one AC to DC converter, the at least one AC to DC converter comprising at least one rectifier;

connecting the at least one AC to DC converter to the second secondary winding polarized such that the at least one rectifier does not conduct when the voltage of the power source is applied to the source transformer primary winding;

connecting at least one filter capacitor to the at least one rectifier;

providing an EMI shielded connection between the at least one first secondary intermediate winding and the second primary of the at least one load transformer;

setting the turns ratios of the transformers such that the natural resonance of the transformers and associated circuitry will cause the voltage across the switching device to collapse to zero without current being conducted in the switching device;

providing a synchronization control circuit connected to the primary winding, the synchronization circuit comprising;

a switching device;
a pulse width modulator for controlling the duration of current flow through the switching device;
a peak voltage detector coupled to the at least one secondary winding, wherein the peak voltage detector provides a feedback signal, proportional to the output voltages, for input to the pulse width modulator;
a zero voltage control circuit connected to the switching device and the pulse width modulator, wherein the zero voltage control circuit controls the time at which conduction is initiated in the switching device, such that conduction begins when there is a substantially null voltage across the switching device and substantially null current flow in the at least one second secondary winding of the at least one load transformer;

initiating current flow through the first primary winding to induce energy storage in the first and the at least one second core;

interrupting current flow through the first primary winding in order to collapse the first and at least one second transformer's magnetic field; and transferring energy from the collapsing magnetic fields to at least one load.

13. A method as in claim 12 wherein the step of providing a synchronization control circuit to control current flow in the primary winding further comprises:

detecting a peak voltage of at least one voltage output from the at least one secondary intermediate winding;

comparing the detected peak voltage to a predetermined reference voltage;

generating a feedback signal based upon the comparison of the detected peak voltage output to the predetermined reference voltage; and controlling the duration of current flow in the primary winding, using a pulse width modulator, such that the detected peak voltage is maintained at a desired level.

14. A method as in claim 13 wherein the step of controlling current flow through the first primary winding further comprises the steps of:

determining when a substantially null voltage event across the switching device occurs;

determining when current in the switching device has not been enabled for a predetermined period of time;

generating a synchronization signal when the null voltage event occurs and the switching device is not enabled;

applying the synchronization signal to a synchronization input of the pulse width modulator, causing it to enable the switching device.

15. A method as in claim 12 wherein the step of controlling current flow through the first primary winding further comprises the steps of:

providing a capacitance connected across the switching device to control the rise times and fall times of voltages and currents, to minimize EMI and power loss, and voltage stress applied to the switching device.

16. A method as in claim 13 wherein the step of controlling current flow through the first primary winding further comprises the steps of:

initializing current flow in the switching device at predetermined intervals, in the event that the natural resonance of the transformers and associated circuitry has not caused a substantially null voltage to appear across the switching device within a predetermined period of time.

17. A soft switched AC power distribution apparatus for minimizing electromagnetic interference and AC losses in an AC power distribution system, the AC power distribution apparatus comprising:

a transformer capable of operating in both flyback and forward modes, wherein the transformer comprises:

a primary winding;

at least one intermediate secondary winding;

a synchronization control circuit connected to the primary winding comprising a switching device for controlling current flow through the primary winding;

a variable reactance connectable to the switching device, wherein the variable reactance is operable to adjust voltage and current rise times in the soft switched AC power distribution apparatus, and wherein the variable reactance is adaptable to store energy resulting from a collapsing magnetic field;

a pulse width modulator for controlling a duty cycle of the switching device;

a peak voltage detector connectable to the at least one intermediate secondary winding;

a logic circuit connectable to the primary winding and the pulse width modulator, the logic circuit operating in conjunction with the peak voltage detector to produce a synchronization signal and a feedback signal, respectively, for input to the pulse width modulator; and at least one load transformer connectable to the at least one intermediate secondary winding, wherein the at least one load transformer connectable to the at least one intermediate secondary winding is connectable via an EMI shielded connection.

18. A soft switched AC power distribution apparatus as in claim 17 wherein the switching device comprises:

a transistor; and a voltage suppression device connectable in parallel with the transistor.

19. A soft switched AC power distribution apparatus as in claim 17 wherein the variable reactance comprises a variable capacitor.

20. A soft switched AC power distribution apparatus as in claim 17 wherein the variable reactance comprises a saturable flyback transformer.

21. A method for providing soft switched AC power distribution, the method comprising the steps of:

providing a transformer capable of operating in both flyback and forward modes, wherein the transformer comprises a primary winding and at least one secondary intermediate winding;

providing a synchronization control circuit for controlling current in the primary winding wherein the synchronization control circuit includes a switch connected to the transformer;

initiating current flow through the primary winding to induce energy storage in the transformer;

interrupting current flow through the primary winding in order to collapse the transformer's magnetic field;

transferring energy from the collapsing magnetic field to the at least one secondary intermediate winding by providing a variable reactance connectable to the primary winding, the variable reactance adaptable to minimize power loss and electromagnetic interference at least one operating condition; and sensing substantially null voltage across the switch indicating substantial transfer of energy to the at least one secondary intermediate winding, where upon current flow through the primary winding is restored.

22. A method as in claim 21 wherein the step of providing current flow through the primary winding to induce energy storage in the flyback transformer further comprises the steps of:

detecting a peak voltage of at least one voltage output from the at least one secondary intermediate winding;

comparing the detected peak voltage output to a predetermined reference voltage; and generating a feedback signal based upon the comparison of the detected peak voltage output to the predetermined reference voltage.

23. A method as in claim 21 wherein the step of controlling current flow through the primary winding further comprises the steps of:

determining when a null voltage event across the switch occurs;

determining when the switch has not been enabled for a predetermined period of time;

generating a synchronization signal when the null voltage event and the switch not enabled event occur substantially simultaneously; and applying the synchronization signal to a synchronization input of the pulse width modulator.

24. A method as in claim 21 wherein the step of providing the variable reactance further comprises the step of providing a saturable flyback transformer.

25. A method as in claim 21 wherein the step of providing a variable reactance further comprises the step of providing a variable capacitor connectable across the switch.

* * * * *